(12) United States Patent
Chen

(10) Patent No.: US 9,709,818 B1
(45) Date of Patent: Jul. 18, 2017

(54) EYEGLASSES WITH QUICK DETACHABLE STRUCTURE

(71) Applicant: ASWAN INTERNATIONAL CORP., Taipei (TW)

(72) Inventor: Yung-An Chen, Taipei (TW)

(73) Assignee: ASWAN INTERNATIONAL CORP., Taipei (TW)

( * ) Notice: Subject to any disclaimer, the term of this patent is extended or adjusted under 35 U.S.C. 154(b) by 0 days.

(21) Appl. No.: 15/049,878

(22) Filed: Feb. 22, 2016

(51) Int. Cl.
*G02C 1/02* (2006.01)
*G02C 5/22* (2006.01)
*G02C 5/14* (2006.01)

(52) U.S. Cl.
CPC ............. *G02C 5/2209* (2013.01); *G02C 1/02* (2013.01); *G02C 5/146* (2013.01); *G02C 2200/08* (2013.01)

(58) Field of Classification Search
CPC . G02C 1/02; G02C 1/023; G02C 1/10; G02C 5/146; G02C 13/001; G02C 2200/08
USPC .................................................. 351/110, 154
See application file for complete search history.

(56) References Cited

U.S. PATENT DOCUMENTS

| 4,998,815 A * | 3/1991 | Lin ........................ G02C 1/02 2/448 |
| 2009/0122257 A1* | 5/2009 | Huang ................... G02C 1/023 351/140 |

* cited by examiner

*Primary Examiner* — Huy K Mai
(74) *Attorney, Agent, or Firm* — Li&Cai Intellectual Property (USA) Office

(57) ABSTRACT

An eyeglasses with quick detachable temple has a lens and two temples. Opposite sides at both ends of the lens are defined as terminal sides respectively, and recesses are formed on the terminal sides respectively. Each recess is formed with a first and second protrusions, and a first and second niches, wherein the first protrusion is opposite to the second protrusion. The first and second niches are adjacent to the first and second protrusions respectively. A distance between the first and second niches is greater than a distance between top ends of the first and second protrusions. Each temple has a wedge unit, and the shape of the wedge unit is corresponding to the shape of the recess. The wedge unit comprises a shallow groove wall, a deep groove wall, a settling bump, and a wedging bump.

10 Claims, 10 Drawing Sheets

EYEGLASSES WITH QUICK DETACHABLE STRUCTURE

BACKGROUND

1. Technical Field

The present disclosure is related to an eyeglasses, more particularly, to an eyeglasses with quick detachable structure.

2. Description of Related Art

Conventional eyeglasses such as the sun glasses, safety glasses, sports lens, or reading glasses, generally include at least one lens and two temples. According to the different kinds of the eyeglasses, the pairs of the eyeglasses may include frame structures and other components. However, despite of kinds of the eyeglasses, in the current common eyeglasses, the connection of the temples and lens (or lenses, or frame structure) is implemented by screwing them. However, in response to the size of the eyeglasses, the screws are small sized, and the specific small sized screwdriver should be required. Therefore, when the user wants to replace one or more components of the eyeglasses, the user cannot replace the one or more components quickly, and even the small sized screws may be lost. Thus, one of the main issues faced by the person with ordinary skill in the eyeglasses field is how to replace one or more components of the eyeglasses quickly. In summary, the inventor of this instant disclosure has contributed to research and developed the eyeglasses with quick detachable structure of the instant disclosure to overcome the abovementioned drawbacks.

SUMMARY OF THE DISCLOSURE

One object of the instant disclosure is to provide an eyeglasses with quick detachable structure. eyeglasses with quick detachable structure according to the present disclosure is configured to address the issues that one or more components of the conventional eyeglasses cannot be replaced quickly.

In order to overcome the abovementioned problem, the present disclosure provides an eyeglasses with quick detachable structure includes a lens and two temples. Two opposite sides at both ends of the lens are defined as two terminal sides respectively, and two recesses are formed on the terminal sides respectively. Each of the recesses is formed with a first protrusion and a second protrusion at two first inner ends of the lens adjacent to the corresponding terminal side, and the second protrusion is opposite to the first protrusion. Each of the recesses is also formed with a first niche on one second inner end of the lens away from the corresponding terminal side and adjacent to the corresponding first protrusion and a second niche on another one second inner end of the lens away from the corresponding terminal side and adjacent to the corresponding second protrusion. A distance from a bottom end of the first niche to a bottom end of the second niche is greater than a distance from a top end of the first protrusion to a top end of the second protrusion. Two temples are pivoted to both ends of the lens respectively. Each of the temples has a wedge unit, and a shape of each of the wedge unit is corresponding to a shape of the corresponding recess. Each of the wedge units has a shallow groove wall, a deep groove wall, a settling bump, and a wedging bump, shapes of the shallow groove wall and the deep groove wall are corresponding to shapes of the first protrusion and the second protrusion respectively, and shapes of the settling bump and the wedging bump are corresponding to shapes of the first niche and the second niche respectively. A distance from a bottom end of the shallow groove wall to a bottom end of the deep groove wall is greater than the distance from the top end of the first protrusion to the top end of the second protrusion. The first protrusion, the second protrusion, the first niche, and the second niche are wedged with the shallow groove wall, the deep groove wall, the settling bump, and the wedging bump respectively, so the temples are secured to the lens.

The instant disclosure has the following advantages. The first protrusion, the second protrusion, the first niche, and the second niche are wedge with the shallow groove wall, the deep groove wall, the settling bump, and the wedging bump respectively, so the two temples are attached to or detached from the lens quickly.

In order to further appreciate the characteristics and technical contents of the present disclosure, references are hereunder made to the detailed descriptions and appended drawings in connection with the instant disclosure. However, the appended drawings are merely shown for exemplary purposes, rather than being used to restrict the scope of the instant disclosure.

DETAILED DESCRIPTION OF THE PREFERRED EMBODIMENTS

The detailed description set forth below describes various configurations of the subject technology and is not intended to represent the only configurations in which the subject technology may be practiced. The detailed description includes specific details for the purpose of providing a thorough understanding of the subject technology. Accordingly, dimensions are provided in regard to certain aspects as non-limiting examples. However, it will be apparent to those skilled in the art that the subject technology may be practiced without these specific details. In some instances, well-known structures and components are shown in order to avoid obscuring the concepts of the subject technology. Like components are labeled with identical element numbers for ease of understanding. Reference numbers may have letter suffixes appended to indicate separate instances of a common element while being referred to generically by the same number without a suffix letter.

Figure 1:
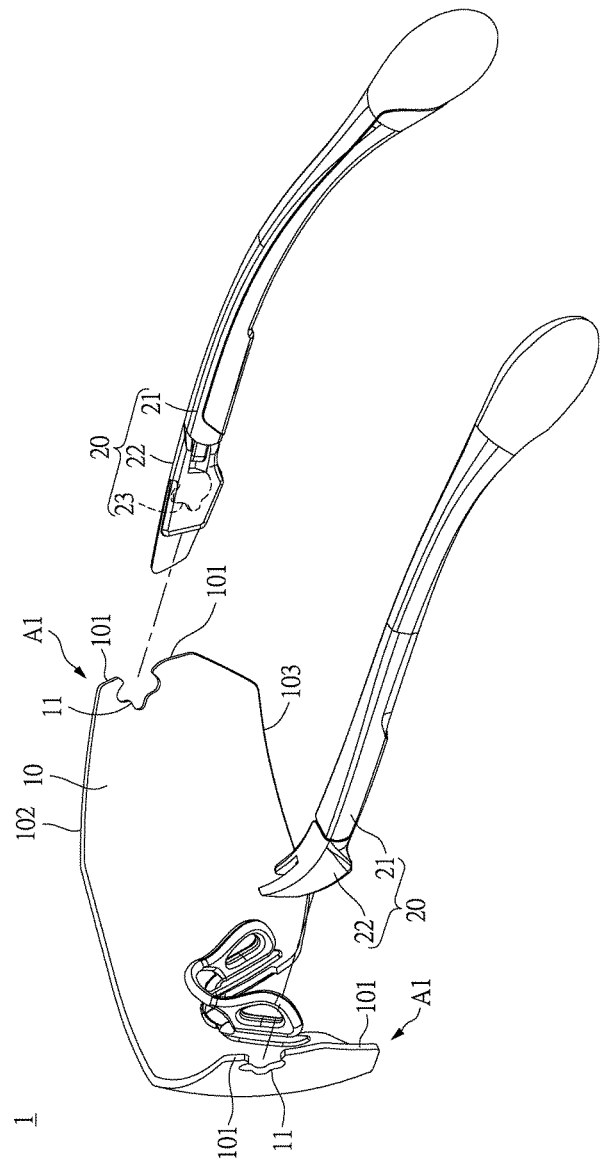
FIG. 1 shows an exploded view of an eyeglasses with quick detachable structure according to one embodiment of the instant disclosure.
Figure 2:
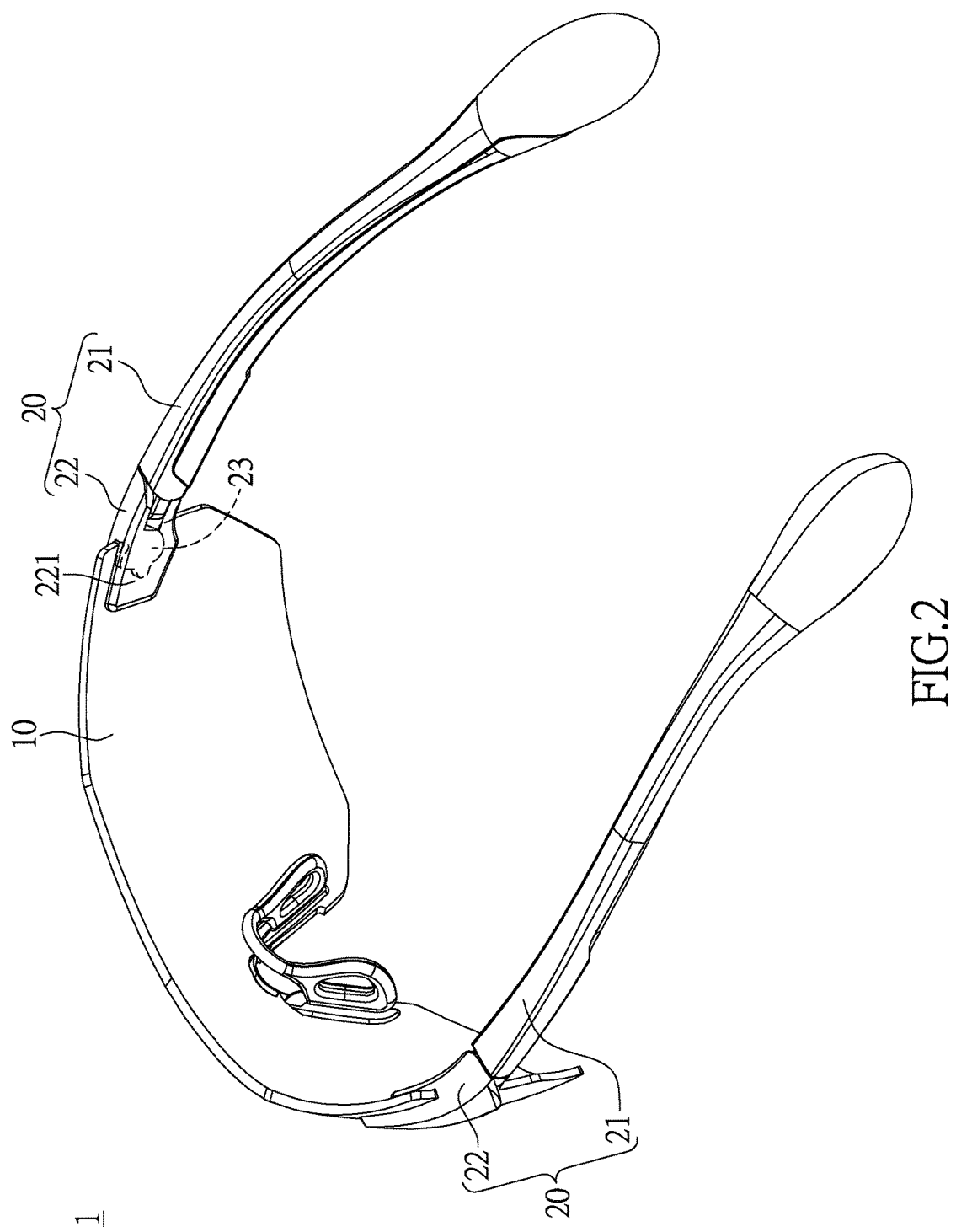
FIG. 2 shows a perspective view of eyeglasses with quick detachable structure according to one embodiment of the instant disclosure.

Please refer to FIG. 1 and FIG. 2, an exploded view and a perspective view of an eyeglasses with quick detachable structure according to one embodiment of the instant disclosure are shown. As shown in FIG. 1 and FIG. 2, eyeglasses with quick detachable structure includes a lens 10 and two temples 20. The two temples 20 are pivotally detachable from two ends A1 of the lens 10.

More specifically, two opposite sides at the two ends A1 of the lens 10 are defined as two terminal sides 101 respectively. Two ends A1 of the lens 10 are formed with two recesses 11 adjacent to the terminal sides 101 respectively. Each of the two temples 20 has a temple arm 21 and a pivotal-connecting portion 22. One end of each temple arm 21 is disposed with the pivotal-connecting portion 22, and the pivotal-connecting portion 22 comprises a wedge unit 23. The two temples 20 are detachably attached to both ends A1 of the lens 10 through the wedge units 23 of the pivotal-connecting portions 22. In other words, the two wedge units 23 of two connecting portions 22 are wedged with the two recesses 11 of the lens 10, so the two temples 20 are detachably attached to both ends A1 of the lens 10.

Figure 3:
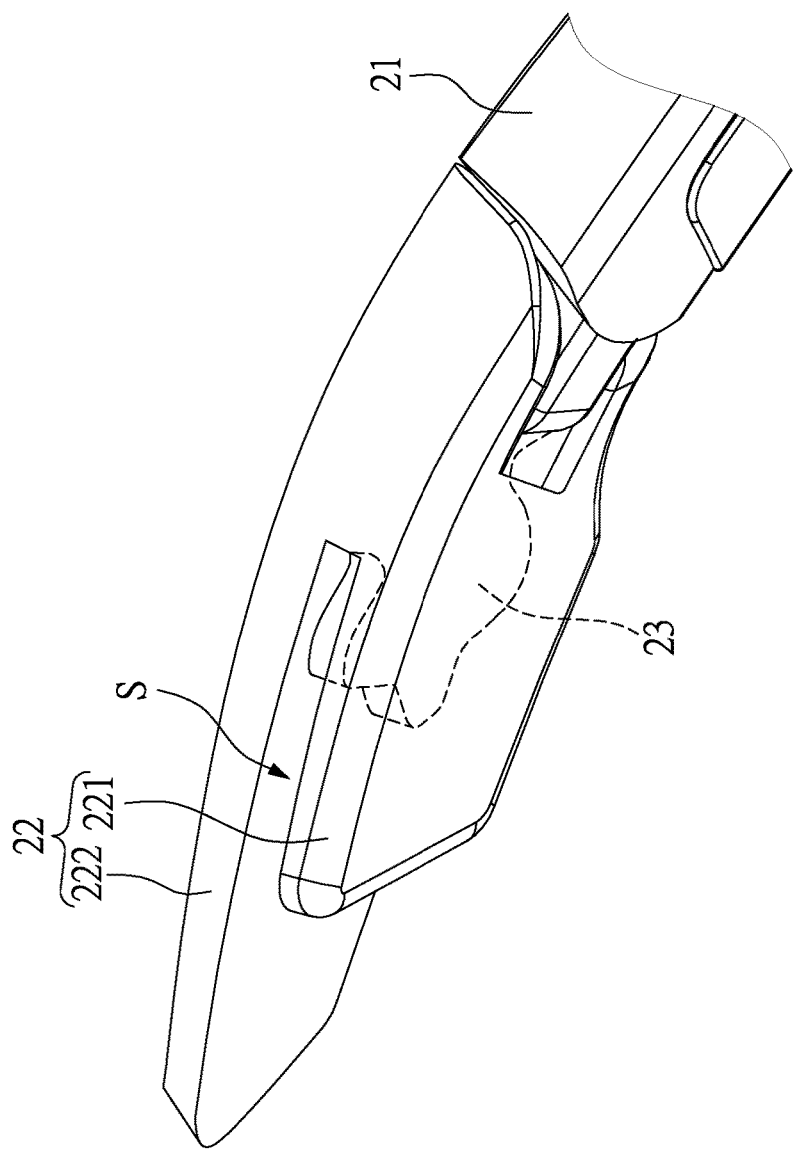
FIG. 3 shows a partial view of a temple of eyeglasses with quick detachable structure according to one embodiment of the instant disclosure.
Figure 4:
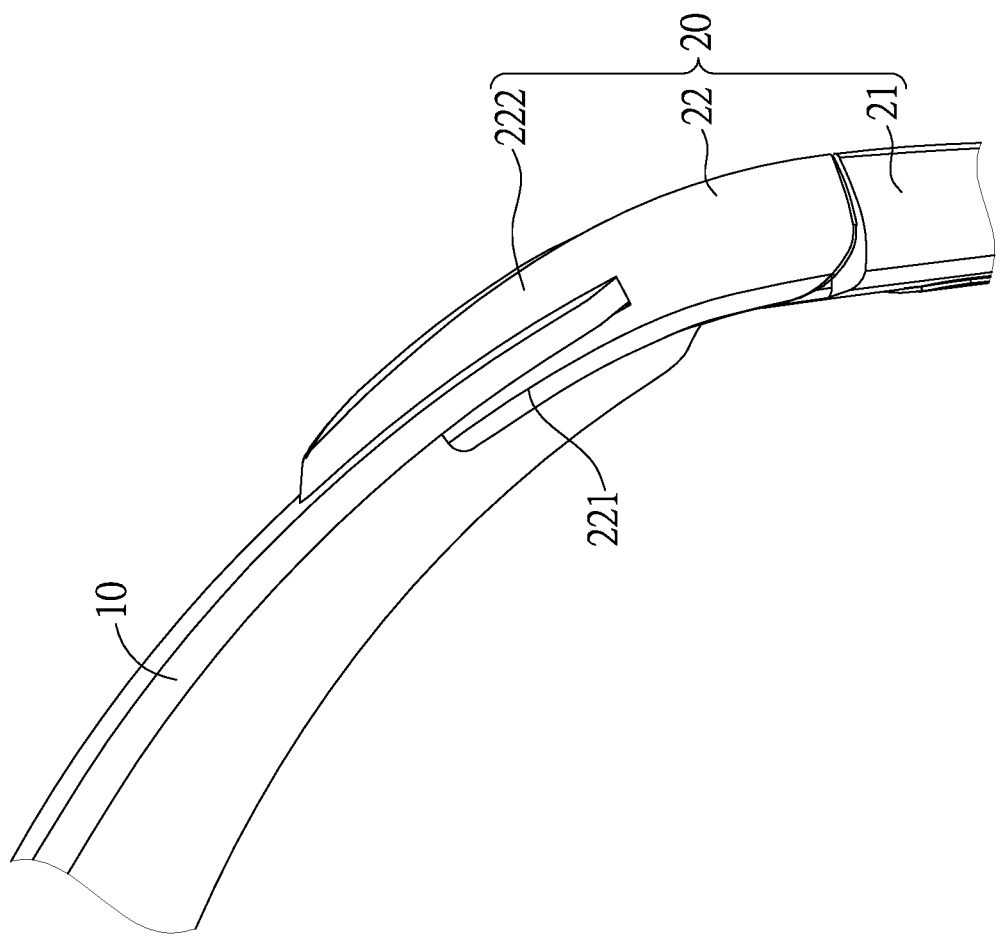
FIG. 4 shows a schematic diagram of the assembly of the temple and the lens of eyeglasses with quick detachable structure according to one embodiment of the instant disclosure.

Please refer to FIG. 3, as shown in FIG. 3, the pivotal-connecting portion 22 of each of the temples 20 includes a front cover 221 and a back cover 222. The front cover 221 is connected to the back cover 222 with spacing, and the wedge unit 23 is formed in a gap S between the first cover 221 and the back cover 222. In the preferred embodiment, the radial length of the front cover 221 and the radial length of the back cover 222 are unequal. The front cover 221 and the back cover 222 fully cover the wedge unit 23. As shown in FIG. 2 through FIG. 4, at least part of the lens 10 wedges the gap S when the temples 20 attaches to the lens 10. The front cover 221 and the back cover 222 of the pivotal-connecting portion 22 are corresponding to the front side and the back side of the lens 10 respectively.

Figure 5:
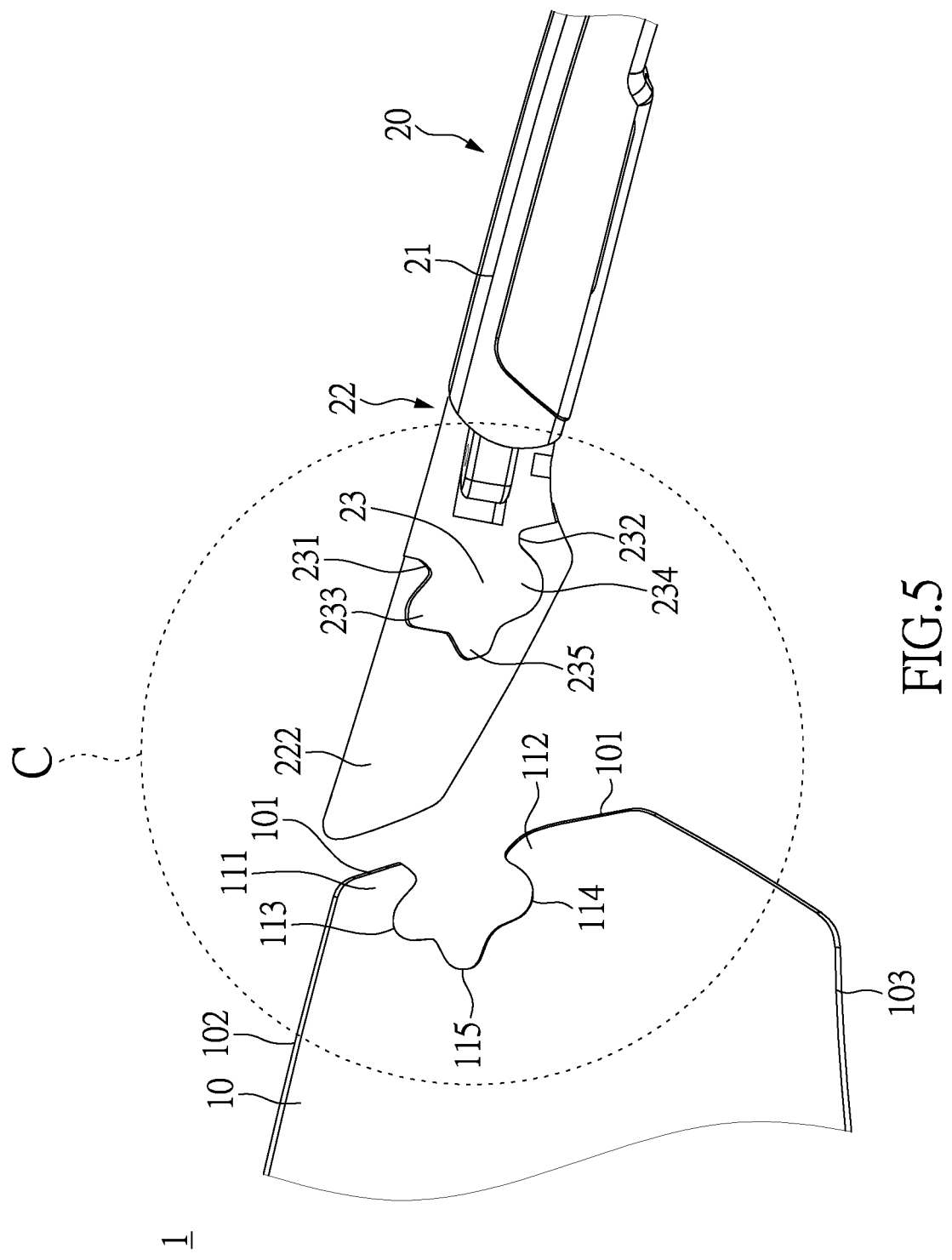
FIG. 5 and FIG. 6 show partial exploded views of the temple and the lens of eyeglasses with quick detachable structure according to one embodiment of the instant disclosure.
Figure 6:
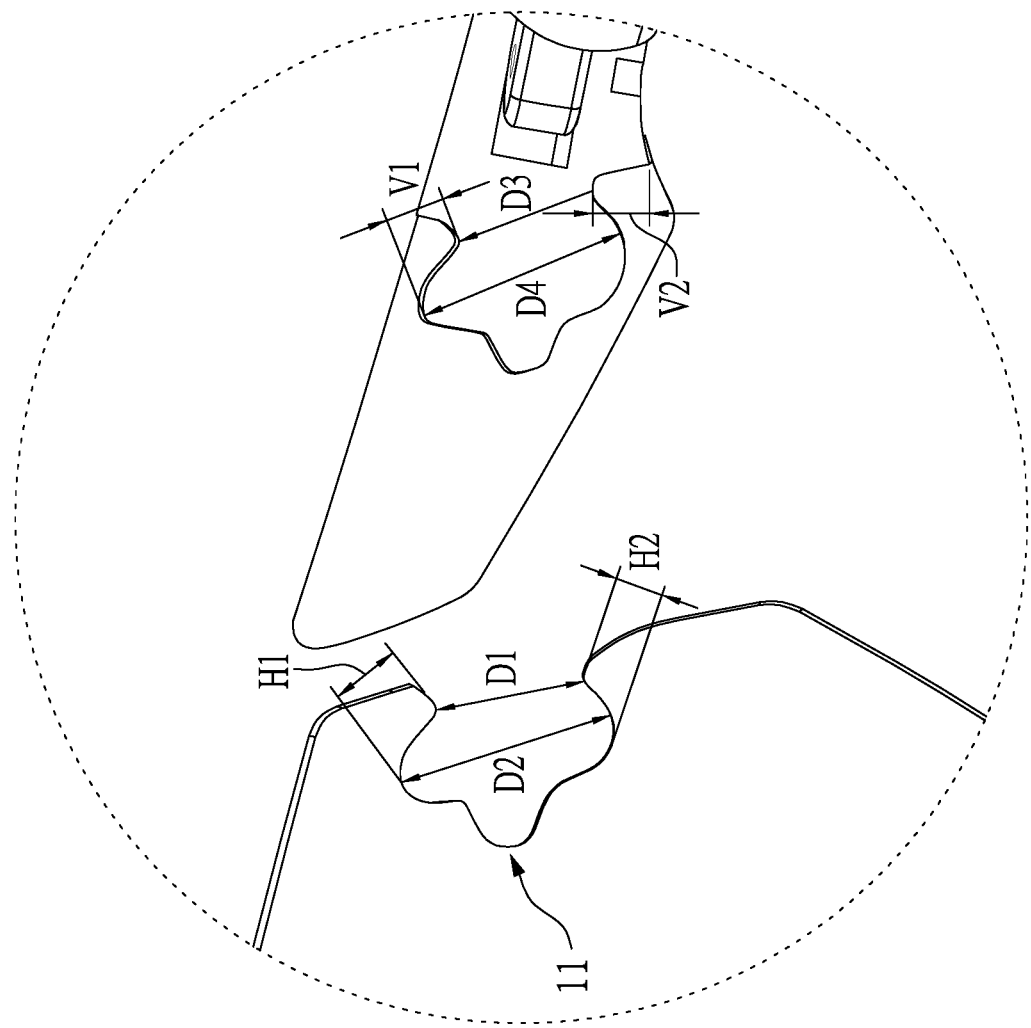

To put it concretely, referring to FIG. 5 and FIG. 6, partial exploded views of the temple 20 and the lens 10 are shown, wherein the front cover 221 (as shown in FIG. 3) of the connecting portion 22 in FIG. 5 and FIG. 6 is omitted for clarification purpose. As shown in FIG. 5 and FIG. 6, each of the recesses 11 is formed with a first protrusion 111 and a second protrusion 112 at two first inner ends of the lens 10 adjacent to the corresponding terminal side 101. The first protrusion 111 is disposed adjacent to the upper edge 102 of the lens 10, and the second protrusion 112 is disposed adjacent to the lower edge 103 of the lens 10.

In this embodiment, one side away from the terminal side 101 of the first protrusion 111 is adjacent to a first niche 113, and another one side away from the terminal side 101 of the second protrusion 112 is adjacent to a second niche 114. That is, each of the recesses 11 is also formed with the first niche 113 and the first niche 114 on second inner ends of the lens 10 away from the corresponding terminal side 101 and adjacent to the corresponding first protrusion 111 and the corresponding second protrusion 112 respectively. An auxiliary niche 115 formed on the lens 10 is connected between the first niche 113 and the second niche 114 and is configured to enhance the wedging force of the wedge unit 23 and the recess 11. In other words, in this embodiment, there are three niches formed in the inner side of the recess 11. However, the recess 11 may be, but not limited to, is designed to be formed with merely two niches (e.g. the first niche 113 and the second niche 114); or alternatively, the recess 11 may be formed with more than four niches (e.g. the first niche 113, the second niche 114, and two auxiliary niches 115, wherein the two auxiliary niches 115 are connected to each other). Certainly, the shapes of the niches can be varied according to the actual requirements, and the shapes of the niches in the drawings are just one implementation among several embodiments.

It is noted that a distance D1 from a top end of the first protrusion 111 to a top end of the second protrusion 112 is smaller than a distance D2 from a bottom end of the first niche 113 to a bottom end of the second niche 114. In other words, a radial length of an opening at the terminal side 101 formed between the corresponding first protrusion 111 and the corresponding second protrusion 112 is smaller than a radial length of an inner space of the recess 11. Preferably, a longitudinal height H1 of the first protrusion 111 is greater than a longitudinal height H2 of the second protrusion 112.

The wedge unit 23 of the temple 20 includes a shallow groove wall 231, a deep groove wall 232, a settling bump 233, and a wedging bump 234. The shapes of the shallow groove wall 231, the deep groove wall 232, the settling bump 233, and the wedging bump 234 are corresponding to the shapes of the first protrusion 111, the second protrusion 112, the first niche 113, and the second niche 114 respectively, so the shallow groove wall 231, the deep groove wall 232, the settling bump 233, and the wedging bump 234 are wedged with the first protrusion 111, the second protrusion 112, the first niche 113, and the second niche 114. Referring to FIG. 6, preferably, the depth V1 of the shallow groove wall 231 is smaller than the depth V2 of the deep groove wall 232. A distance D3 from a bottom end of the shallow groove wall 231 to a bottom end of the deep groove wall 232 is smaller than a distance D4 from a top end of the settling bump 233 and a top end of the wedging bump 234. A distance D4 from the top end of the settling bump 233 to the top end of the wedging bump 234 is not greater than the distance D2 from the bottom end of the first niche 113 to the bottom end of the second niche 114. The distance D1 from the top end of the first protrusion 111 to the top end of the second protrusion 112 is smaller than the distance D3 from the bottom end of the shallow groove wall 231 to the bottom end of the deep groove wall 232.

In other words, when the wedge unit 23 wedges the recess 11, the shallow groove wall 231, the deep groove wall 232, the settling bump 233, and the wedging bump 234 are wedged with first protrusion 111, the second protrusion 112, the first niche 113, and the second niche 114 in presentation of a semi-sophisticated joint. However, the lens 10 may be broken if the abovementioned wedge unit 23 wedges the recess 11 in presentation of a sophisticated joint.

Figure 7:
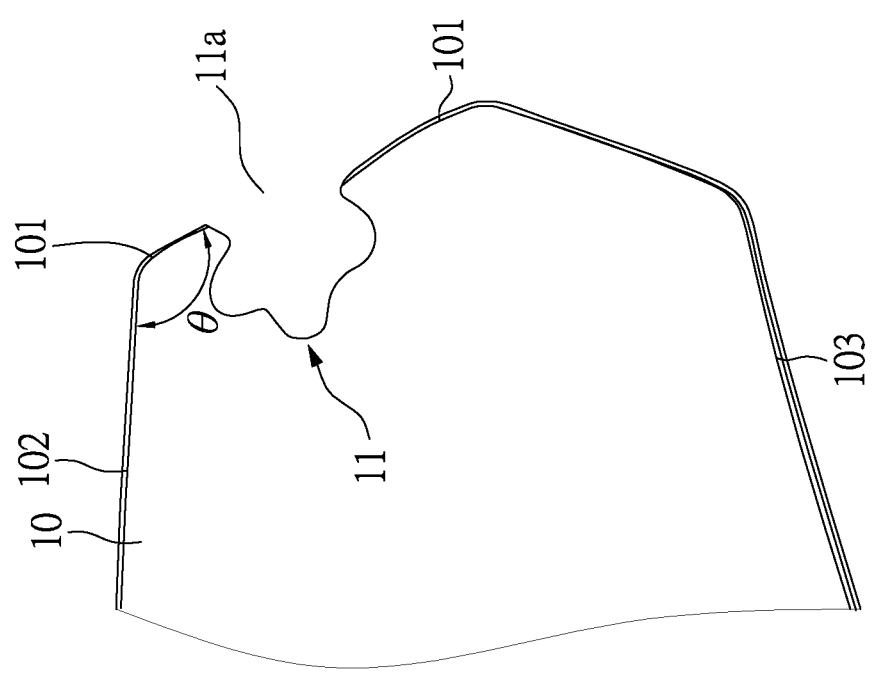
FIG. 7 shows a partial enlarged view of lens of eyeglasses with quick detachable structures according to one embodiment of the instant disclosure.

It is noted that, as shown in FIG. 7, an angle between the terminal side 101 of the lens 10 and the upper edge 102 of the lens 10 in the embodiment is an obtuse angle, and the terminal side 101 is inclined to the upper edge 102, so an opening 11a formed in the recess 11 of the terminal side 101 slopes toward the upper edge 102, and the temple 20 can be smoothly attached to the lens 10. In short, in the preferred embodiment, the centre line of the recess 11 formed on the terminal side 101 of the lens 10 is inclined to the upper edge 102 of the lens 10. In this embodiment, the wedge unit 23 further comprises an auxiliary bump 235 formed between the settling bump 233 and the wedging bump 234. The shape of the auxiliary bump 235 is corresponding to the shape of the auxiliary niche 115 of the recess 11. The auxiliary bump 235 wedges the auxiliary niche 115 to enhance the wedging force between the wedge unit 23 and recess 11. Certainly, in other embodiments, the shape and the number of the auxiliary bump 235 can vary according to the actual requirements.

Figure 8:
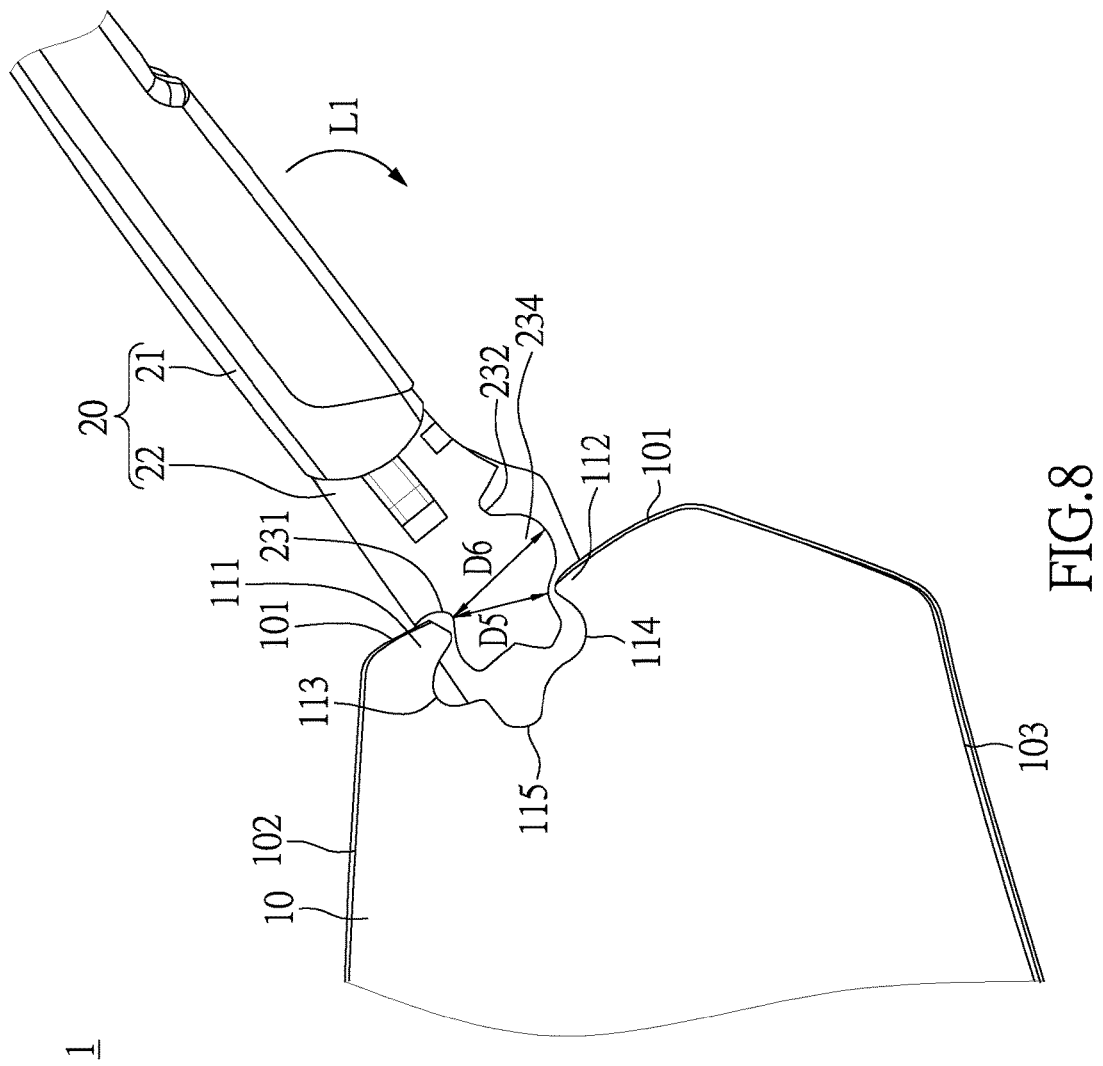
FIG. 8 and FIG. 9 show schematic diagrams for illustrating a wedging action interacted by a wedge unit and a recess of eyeglasses with quick detachable structure according to one embodiment of the instant disclosure.
Figure 9:
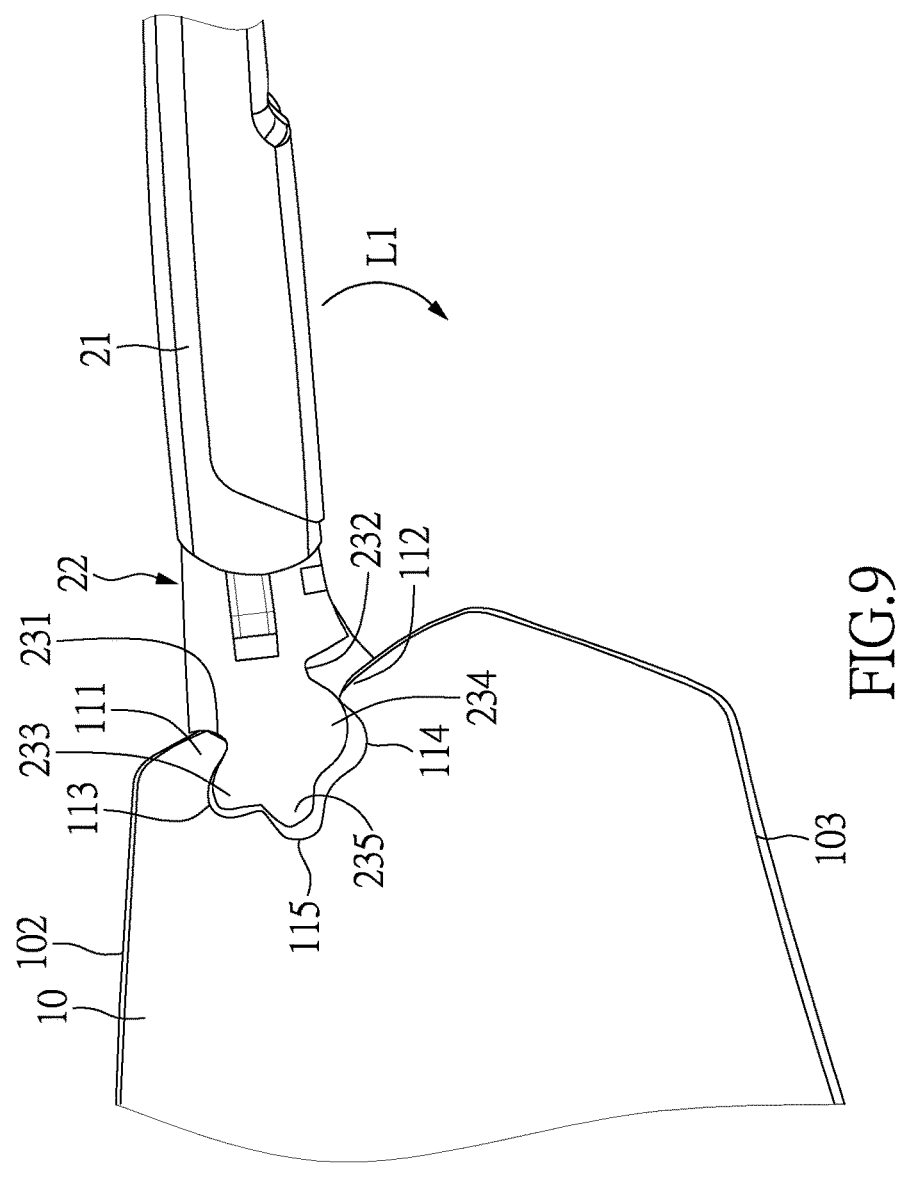
Figure 10:
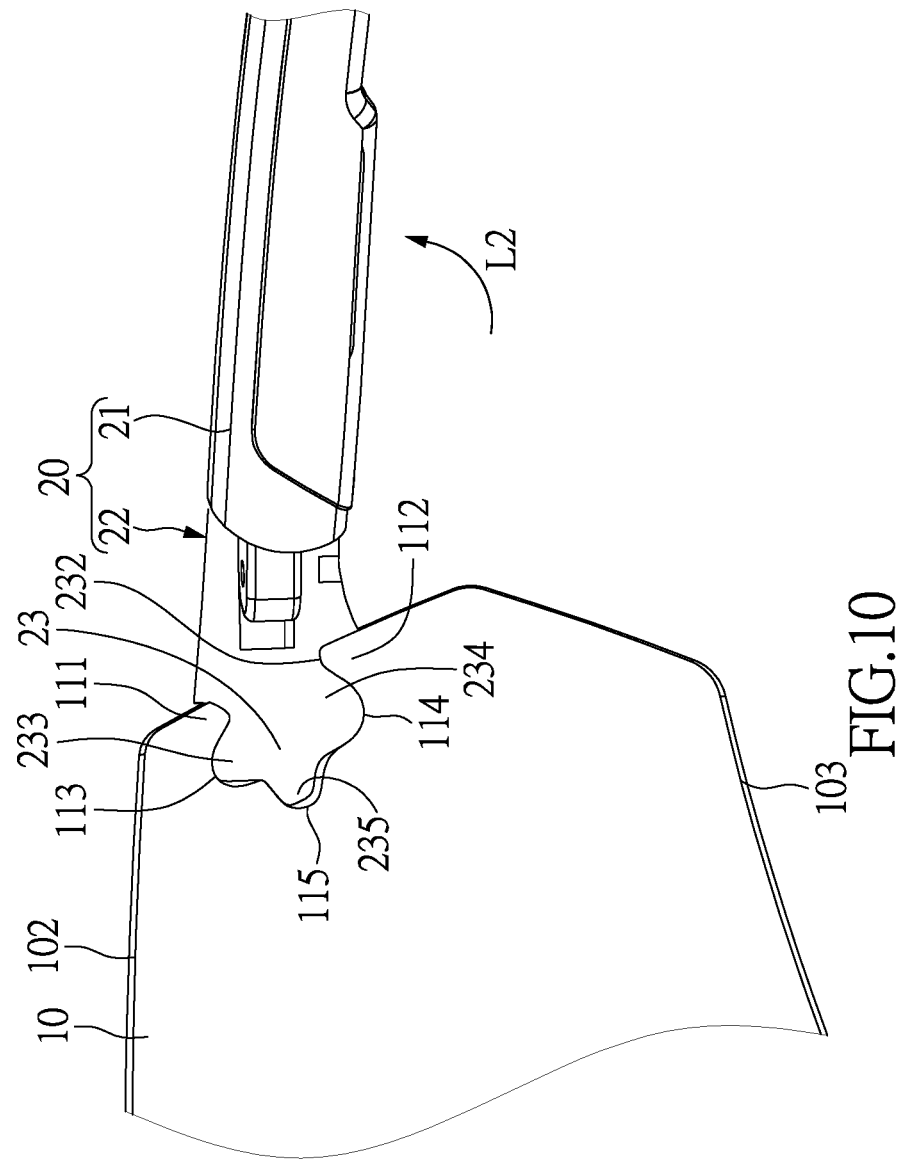
FIG. 10 shows a schematic diagram which the wedge unit of eyeglasses with quick detachable structure wedges the recess of the eyeglasses with quick detachable structure according to one embodiment of the instant disclosure.

Referring to FIG. 8 through FIG. 10, schematic diagrams for illustrating a wedging action interacted by the temple 20 and the lens 10 are shown. As shown in FIG. 8, the user firstly wedges the first protrusion 111 of the lens 10 within the shallow grove wall 231 of the wedge unit 23 of the temple 20. Then, the temple side bar 20 rotates toward the lens 10 (i.e. the rotating direction L1 as shown in the drawings) around the a position which the shallow groove wall 231 is wedged with the first protrusion 111. When one side of the wedging bump 234 abuts against one side of the second protrusion 112, part of the wedge unit 23 (i.e. the settling bump 233, the wedging bump 234, auxiliary bump 235, and a notch between the wedging bump 234 and the auxiliary bump 235) are received into the recess 11. In other words, when the temple 20 and lens 10 are disposed in the status of FIG. 8, the distance D1 from the top end of the first protrusion 111 to the top end of the second protrusion 112 is greater than a distance D5 from the bottom end of the shallow groove wall 231 to bottom end of a notch between the wedging bump 234 and the auxiliary bump 235, and a distance D6 from the bottom end of the shallow groove wall 231 to the top end of the wedging bump 234 is greater than the distance D1 from the top end of the first protrusion 111 to the top end of the second protrusion 112.

As shown in FIG. 9, when the user rotates the temple 20 as shown in FIG. 8 further toward the lens 10 (i.e. the rotating direction L1 as shown in the drawings), part of the wedging bump 234 enters the recess 11 through the second protrusion 112, and part of the top end of the wedging bump 234 abuts against the top end of the second protrusion 112, so the temple 20 wedges the lens 10. Referring to FIG. 10, when the user rotates the temple 20 in FIG. 9 further toward the rotating direction L1, the wedging bump 234 entirely enters the recess 11 through the second protrusion 112. Meanwhile, the first protrusion 111, the second protrusion 112, the first niche 113, the second niche 114, and the auxiliary niche 115 wedge the shallow groove wall 231, the deep groove wall 232, the settling bump 233, the wedging bump 234, and the auxiliary bump 235 respectively, so the temple 20 is secured within lens 10 stably. It is noted that, when the wedge unit 23 of the temple 20 wedges the recess 11 of the lens 10, the top ends of the first protrusion 11 and the second protrusion 112 entirely enter the shallow groove wall 231 and the deep groove wall 232 respectively. In other words, part of the shallow groove wall 231 and the deep groove wall 232 abut against the terminal side 101 of the lens 10.

More specifically, as shown in FIG. 10, in practice, when the temple 20 wedges the lens 10, at least three of the first protrusion 111, the second protrusion 112, the first niche 113, the second niche 114, and the auxiliary niche 115 preferably abut against the corresponding structure of the wedge unit 23 (the shallow groove wall 231, the deep groove wall 232, the settling bump 233, the wedging bump 234, and the auxiliary bump 235), such that when the temple 20 is secured within the lens 10, the more stable wedging relation of the temple 20 and the lens 10 is obtained, and the it is hard to cause a shake between the temple 20 and the lens 10.

As shown in FIG. 10, by contrast, when the user wants to detach the temple 20 from the lens 10, the user can rotates the temple 20 away from the lens 10 (i.e. the rotating direction L2 in the drawings), such that the temple 20 is rotated toward the rotating direction L2 around a position which the shallow groove wall 231 wedges the first protrusion 111, the status of the temple 20 and the lens 10 in FIG. 10 is sequentially changed to the statuses in FIG. 9 and FIG. 8, and the temple 20 is detached from the lens 10. It is noted that, as shown in FIG. 10, when the temple 20 wedges the lens 10, a gap (not shown in the drawings) exists between the settling bump 233 and the first niche 113, and the gap particularly exists at a rotating path which the temple 20 is rotated toward the rotating direction L2, so the temple 20 is detached from the lens 10 quickly and easily.

In practice, a connection portion between the shallow groove wall 231 and the settling bump 233 is relatively sloped, and a connection portion between the deep groove wall 232 and wedging bump 234 is relatively smooth, so the temple 20 can be easily detached from the lens 10. In a specific application, a distance (not shown in the drawings) from a bottom end of a notch formed between the settling bump 233 and the auxiliary bump 235 to the top end of the wedging bump 234 is designed to be greater than a distance from the top end of the first protrusion 111 to the top end of the second protrusion 112, such that when the user attaches the temple 20 to the lens 10, the second protrusion 112 cannot firstly be wedged with the shallow groove wall 232 since the settling bump 233 abuts against outside the first protrusion 111 meanwhile. The user must attach the temple 20 to the lens 10 by the manner shown by FIG. 8 through FIG. 10, and the attaching manner of the user is limited to avoid the user from attaching the temple 20 in the incorrect direction.

In summary, in eyeglasses with quick detachable structure of the present disclosure, by designing the recesses in the lens and wedge unit in the temple, the temple can be quickly detached from and attached to the lens. Thus, the lens or the temple can be replaced quickly in response to the user's demands.

The descriptions illustrated supra set forth simply the preferred embodiments of the instant disclosure; however, the characteristics of the instant disclosure are by no means restricted thereto. All changes, alterations, or modifications conveniently considered by those skilled in the art are deemed to be encompassed within the scope of the instant disclosure delineated by the following claims.

What is claimed is:

1. An eyeglasses with quick detachable structure, comprising:
   a lens, two opposite sides at both ends of the lens are defined as two terminal sides respectively, two recesses are formed on the terminal sides respectively, each of the recesses is formed with a first protrusion and a second protrusion at two first inner ends of the lens adjacent to the corresponding terminal side, the second protrusion is opposite to the first protrusion, each of the recesses is also formed with a first niche on one second inner end of the lens away from the corresponding terminal side and adjacent to the corresponding first protrusion and a second niche on another one second inner end of the lens away from the corresponding terminal side and adjacent to the corresponding second protrusion, and a distance from a bottom end of the first niche to a bottom end of the second niche is greater than a distance from a top end of the first protrusion to a top end of the second protrusion; and
   two temples pivoted to the both ends of the lens respectively, each of the temples has a wedge unit, a shape of each of the wedge units is corresponding to a shape of the corresponding recess, each of the wedge units has a shallow groove wall, a deep groove wall, a settling bump, and a wedging bump, shapes of the shallow groove wall and the deep groove wall are corresponding to shapes of the first protrusion and the second protrusion respectively, shapes of the settling bump and the wedging bump are corresponding to shapes of the first niche and the second niche respectively, and a distance from the a bottom end of the shallow groove wall to a bottom end of the deep groove wall is greater than a distance from the top end of the first protrusion to the top end of the second protrusion;

wherein the first protrusion, the second protrusion, the first niche, and the second niche are wedged with the shallow groove wall, the deep groove wall, the settling bump, and the wedging bump respectively, so the temples are secured to the lens.

2. The eyeglasses with quick detachable structure according to claim 1, wherein each of the first protrusions is formed on the corresponding first inner end of the lens adjacent to an upper edge of the lens, and each of the second protrusions is formed on the corresponding second inner end adjacent to a lower edge of the lens; a depth of the shallow groove wall is smaller than a depth of the deep groove wall, and a height of the first protrusion is greater than a height of the second protrusion.

3. The eyeglasses with quick detachable structure according to claim 1, wherein at least one auxiliary niche formed on the lens is connected between the first niche and the second niche adjacent to the recess, and the wedge unit has an auxiliary bump corresponding to the auxiliary niche, wherein a shape of the auxiliary niche is corresponding to a shape of the auxiliary bump, and the auxiliary niche is wedged with the auxiliary bump.

4. The eyeglasses with quick detachable structure according to claim 3, wherein a distance from the bottom end of the shallow groove wall of the wedge unit to the bottom end of a notch between the wedging bump and the auxiliary bump is smaller than the distance from the top end of the first protrusion to the top end of the second protrusion, and when the first protrusion wedges the shallow groove wall, the temple is rotated toward the lens to make the wedge unit enter the recess.

5. The eyeglasses with quick detachable structure bars according to claim 3, wherein a distance from the bottom end of a notch between the settling bump and the auxiliary bump to the top end of the wedging bump is greater than the distance from the top end of the first protrusion to the top end of the second protrusion.

6. The eyeglasses with quick detachable structure according to claim 1, wherein each of the two temples has a pivotal-connecting portion, and the pivotal-connecting portion includes a front cover and a back cover, the front cover and the back cover are connected with spacing, the wedging unit is disposed between the front cover and the back cover, and the front cover and the back cover hide the wedge unit.

7. The eyeglasses with quick detachable structure according to claim 1, wherein a distance from the top end of the settling bump of the wedge unit to the top end of the wedging bump is smaller than distance from the bottom end of the first niche to the bottom end of the second niche.

8. The eyeglasses with quick detachable structure according to claim 1, wherein a longitudinal height of the first protrusion is greater than a longitudinal height of the second protrusion.

9. The eyeglasses with quick detachable structure according to claim 1, the distance from the bottom end of the shallow groove wall of the wedge unit to the deep groove wall of the wedge unit is smaller than a distance from the top end of the settling bump to the top end of the wedging bump.

10. The eyeglasses with quick detachable structure according to claim 1, wherein an angle formed between each of the terminal sides of the lens and an upper edge of the lens is an obtuse angle, and an opening formed in each of the recesses of the terminal side slopes toward the upper edge of the lens.

\* \* \* \* \*